(12) United States Patent
Ryu et al.

(10) Patent No.: US 7,716,713 B1
(45) Date of Patent: May 11, 2010

(54) METHOD AND DEVICE FOR CONTROLLING THE POINT OF TIME OF THE OPERATION OF AN APPLICATION IN DIGITAL DATA BROADCASTING

(75) Inventors: Joo-hyeon Ryu, Seoul (KR); Qu-Ho Hwang, Seoul (KR); Seong-nam Oh, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 09/574,003

(22) Filed: May 19, 2000

(30) Foreign Application Priority Data

May 20, 1999 (KR) ................................ 1999-18173
Aug. 9, 1999 (KR) ................................ 1999-32499

(51) Int. Cl.
  *H04N 7/173* (2006.01)
  *H04N 7/16* (2006.01)
  *H04N 7/10* (2006.01)
  *H04N 7/025* (2006.01)

(52) U.S. Cl. .................... 725/132; 725/32; 725/140; 725/152

(58) Field of Classification Search .............. 725/131, 725/132, 139, 140, 151, 152, 32, 34
See application file for complete search history.

(56) References Cited

U.S. PATENT DOCUMENTS

| 5,818,440 | A | * | 10/1998 | Allibhoy et al. ............. 345/718 |
| 5,819,034 | A | * | 10/1998 | Joseph et al. ............... 709/201 |
| 5,826,166 | A | * | 10/1998 | Brooks et al. ............... 725/134 |
| 6,295,647 | B1 | * | 9/2001 | Ramaswamy ............... 725/116 |
| 6,373,534 | B1 | | 4/2002 | Yasuki et al. |
| 6,427,238 | B1 | * | 7/2002 | Goodman et al. .......... 725/136 |
| 6,571,391 | B1 | * | 5/2003 | Acharya et al. ............... 725/87 |
| 6,588,014 | B1 | * | 7/2003 | Hayashi ....................... 725/54 |
| 6,675,385 | B1 | * | 1/2004 | Wang .......................... 725/39 |
| 2003/0022643 | A1 | * | 1/2003 | Djupsjobacka et al. .... 455/158.1 |

FOREIGN PATENT DOCUMENTS

| JP | 11-27641 | 1/1999 |
| JP | 11-027641 | 1/1999 |
| JP | 11-146362 | 5/1999 |
| JP | 2000-270303 | 9/2000 |

OTHER PUBLICATIONS

Japanese Patent Office Action.

* cited by examiner

*Primary Examiner*—Joseph G Ustaris
(74) *Attorney, Agent, or Firm*—Staas & Halsey LLP

(57) ABSTRACT

A digital broadcast system includes a digital broadcasting device which transmits service data together with a broadcast program, wherein the service data includes an application which allows a digital broadcasting receiver to perform a particular operation and information associated with the operating mode of the application. The digital broadcast system also includes a digital broadcasting receiver which receives the service data and executes the application when the operating mode of the application is an initial operating mode, and otherwise, waits until there is a service request by a viewer, and then executes the application. The digital broadcast system for broadcasting additional service data together with broadcast programs can arbitrarily select the point of time at which an application provided to a digital broadcast receiver is executed, during the manufacture of contents, so that various types of interactive services can be provided.

33 Claims, 6 Drawing Sheets

METHOD AND DEVICE FOR CONTROLLING THE POINT OF TIME OF THE OPERATION OF AN APPLICATION IN DIGITAL DATA BROADCASTING

CROSS-REFERENCE TO RELATED APPLICATIONS

This application claims the benefit of Korean Application No. 99-18173 and 99-32499, filed May 20, 1999 and Aug. 9, 1999, in the Korean Industrial Property Office, the disclosures of which are incorporated herein by reference.

BACKGROUND OF THE INVENTION

1. Field of the Invention

The present invention relates to a digital broadcasting system, and more particularly, to a device and method for controlling an operating mode of an application included in service data which is transferred together with a broadcast program.

2. Description of the Related Art

Information processing speed is increasing due to the development of personal computers (PCs), and information transmission speed is also improving due to the spread of the Internet. As a result, PCs may either coexist with TVs, or PCs and TVs may be integrated. The combination of a PC and a TV can be achieved by integrating TV functions into a PC or by integrating PC functions into a TV. These two types of combinations have already been partially accomplished. Reception cards for Internet TVs or PC TVs have been developed and used. However, it is still considered that these combinations do not employ sufficiently the merits of the two media.

Digital TVs, which have been developed to overcome the complaints about existing analog TVs, can provide multiple channels and a high image quality compared to the analog TVs, and several functions that cannot be provided by analog TVs. In particular, broadcasting of multimedia data together with programs constituted of video and audio has allowed TVs to provide various types of multimedia data services.

That is, digital TV techniques are developed to techniques for providing various data services based on current high quality of image and high quality of sound, and the data service is moving from one-way services toward interactive services using a two-way channel.

The types of services that can be provided by this type of data broadcasting can be roughly classified into data services related to particular programs, independent data services, and interactive data services. The characteristics of each service type will now be described.

For data service related to a particular program, information associated with a program being currently broadcast is transmitted together with a broadcast signal (e.g., an audio signal, a video signal or the like). Here, the information includes information associated with the sports relay broadcast (e.g., player record information, sports terms, game rules, main event information, and so on), additional information on soap operas, additional information on a commercial being currently broadcast, and others.

For independent data services, independent information not related to a program being currently broadcast is sent together with a broadcast signal, and then the independent information is displayed on a screen upon demand by a viewer. Here, the independent information includes information such as real time news, weather forecasts, stock market quotations, software downloads, electronic coupons, and web contents. The independent data service can provide an interactive service which faithfully employs multimedia, since it can use not only simple texts, but also applications such as hypertext, graphics, images, animations, audio/video clips, and Java applets. For example, while a basketball game is being relayed, detailed information on a particular player can be displayed on one area of a TV screen, or a past scene where the player's plays can be provided through a video clip.

For interactive data service, the input of a viewer is transmitted to a broadcast company, and the viewer can be provided with a broadcast service corresponding to his or her input. After viewers establish an environment capable of receiving the two-way data service by securing a two-way channel using a modem, a leased circuit or the like, they can be provided with services such as public opinion polls, voting for ranking popular songs, audience rating surveys, popularity votes, question surveys, home shopping, or the like. Also, various other interactive services can be accomplished by connection with external information providers.

The data service connected with a particular program, and the independent data service are generally achieved through a one-way service such as a data broadcast. However, a data carousel system for repeatedly providing data having an effective period is additionally used to enable the interactive service at any time in the middle of the one-way data service.

FIG. 1 illustrates the reception, from a broadcast station by a digital broadcast receiver (e.g., a digital TV), of program A and service data associated with program A (e.g., an application or the like), which is transmitted by the data carousel method. As can be seen from FIG. 1, a digital TV repeatedly receives service data related to program A while receiving and outputting an audio/video signal associated with program A.

These interactive services can be realized by HTML, Java, data service protocol techniques or the like. The HTML technique is used to express data being provided on a screen, and the Java technique is used to secure the reproduction of broadcast contents independent of the type of hardware and operating system of a receiver. Thus, the contents of a data broadcast are an HTML application and a Java application. The HTML and Java applications can include various types of texts, audio data, video data, and graphic data.

The data service protocol is a standard for including these contents in a broadcast signal constituted of a moving picture experts group-2 transport stream (MPEG-2 TS).

The Advanced Television Systems Committee (ATSC) in U.S.A. and the Digital Video Broadcasting (DVB) in Europe have established related standards to support these enhanced/interactive broadcast services.

ATSC is an organization for establishing standards for digital TV related techniques in the U.S.A. In particular, technical groups such as T3/S13 (data broadcasting), T3/S16 (interactive services), T3/S17 (DTV applications software environment: DASE), and data implementation work group (DIWG), establish data broadcast related standards.

T3/S17 (DASE) defines standards related to software structures within digital TV receivers for supporting a data service, T3/S13 (data broadcasting) defines data service protocols, and T3/S16 (interactive services) defines standards for two-way services using digital broadcasting. The definition of a session protocol for the two-way service, and a definition of a system structure including the operation and performance required for a two-way data channel, are being discussed with a high priority.

However, T3/S13/S16 defines only a method of transporting an application, and does not define a method of setting a point of time when an application starts. Hence, an application received by a digital broadcast receiver is supposed to be executed only when demanded by a viewer. That is, the application received by a digital broadcast receiver can be executed only when a viewer executes the application clearly.

However, there are applications that must be executed immediately after being received. For example, an application which functions in relation to a broadcast itself, or an application such as urgent news, must be executed immediately after being received, independent of the selection of viewers. As described above, a conventional digital broadcast system cannot provide a variety of services which consider the operating mode of an application which is additionally transmitted.

SUMMARY OF THE INVENTION

An objective of the present invention is to provide various services by enabling the operating mode of an application which is provided to a digital broadcast receiver to be arbitrarily selected at the time of manufacture of the Contents, in a digital broadcast system that provides a broadcast program and service data related to the broadcast program.

To achieve the above objective, the present invention provides a digital broadcast system including: a digital broadcasting device which transmits service data together with a broadcast program, wherein the service data includes an application for allowing a digital broadcasting receiver to perform a particular operation and information associated with the operating mode of the application; and a digital broadcasting receiver for receiving the service data and executing the application when the operating mode of the application is an initial operating mode, and otherwise, waiting until there is a service request by a viewer, and then executing the application.

Preferably, the digital broadcasting receiver includes: a service data receiving unit for receiving the service data; a storage unit for storing the service data received from the service data receiving unit; a service request unit for requesting a service with respect to the received service data; and a processing unit for determining whether the operating mode of an application is an initial operating mode, with reference to information associated with the operating mode of an application in the service data stored in the storage unit, and, if it is determined that the operating mode is an initial operating mode, executing the application, and otherwise, waiting until a service is requested by a viewer through the service request unit, and then executing the application.

It is also preferable that information associated with the operating mode of the application is included in a service description table (SDT) for the service data, and that the name of the application is set in the SDT for the service data.

Preferably, information associated with the operating mode of the application can be set when a service data provider manufactures the service data.

Also, preferably, the service data is transported by a data carousel method.

To achieve the above objective, the present invention provides a method of processing an application in a digital broadcast system, the method including: a service data transporting step of transporting service data associated with a broadcast program, wherein the service data includes an application for allowing a digital broadcasting receiver to perform a particular operation and information associated with the operating mode of the application; and an application processing step of receiving the service data, and executing the application if it is determined with reference to information associated with the operating mode of the application that the operating mode of the application is an initial operating mode, and otherwise, waiting until there is a service request by a viewer, and then executing the application.

To accomplish the above objective, the present invention provides a digital broadcast receiver in a digital broadcast system which transports service data associated with a broadcast program, together with the broadcast program, in the form of a data packet, wherein the service data includes an application for allowing the digital broadcast receiver to perform a particular operation, and information associated with the operating mode of the application. The receiver includes: a demultiplexer for receiving the data packet and extracting audio data, video data and service data associated with a particular program from the received data packet; an audio/video decoder for decoding the audio/video data; a data output controller for controlling the output of the service data; an audio/video output unit for outputting the decoded audio/video data and the service data; a service request unit for requesting the execution of an application in the service data associated with the program; and a processing unit for determining whether the operating mode of the application is an initial operating mode, with reference to information associated with the operating mode of the application in the extracted service data, and executing the application if it is determined that the operating mode of the application is an initial operating mode, and otherwise, waiting until a service is requested by a viewer through the service request unit, and then executing the application when there is a service request.

Preferably, information associated with the operating mode of the application is included in a service description table (SDT) for the service data, and the name of the application is set in the SDT for the service data.

It is also preferable that the service data is transported in the form of an MPEG-2 TS packet.

Preferably, the service data is transported by a data carousel method.

To accomplish the above objective, the present invention provides a method of controlling a digital broadcast receiver, in a digital broadcast system which transports service data associated with a broadcast program, together with the broadcast program, in the form of a data packet, wherein the service data includes an application for allowing the digital broadcast receiver to perform a particular operation, and information associated with the operating mode of the application. The method includes: receiving the data packet and extracting audio data, video data and service data associated with a particular program from the received data packet; decoding the audio/video data; outputting the decoded audio/video data; and determining whether the operating mode of an application included in the extracted service data is an initial operating mode, with reference to information associated with the operating mode of the application, and executing the application if it is determined that the operating mode of the application is an initial operating mode, and otherwise, waiting until a service is requested by a viewer, and then executing the application when there is a service request by a viewer.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
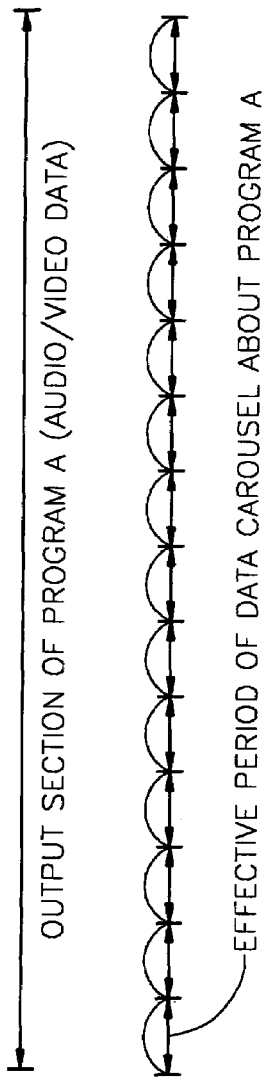
FIG. 1 illustrates the reception, from a broadcast station by a digital broadcast receiver (e.g., a digital TV), of program A and data associated with program A (e.g., an application or the like) according to the data carousel method.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

For example, an operating mode in an embodiment of the present invention is for enabling an application to automatically execute immediately after being received, but the concept of the operating mode can be easily extended to a mode for reserving an operating time.

First, in a digital broadcast system according to the present invention, a moving picture experts group-2 transport stream (MPEG-2 TS) system can be used as a data service protocol which transfers broadcast programs and service data from broadcast stations to digital TVs. The syntax of a transport stream of the MPEG-2 TS system, which can be used as a transfer system of the present invention, and the syntax of a TS packet, which constitutes a transport stream, will now be described with reference to FIG. 2. The transport stream includes a plurality of transport stream packets (i.e., TS packets), each of which is constituted of 188 bytes and roughly divided into a header, which provides information on a corresponding TS packet, and a payload, in which data is actually recorded.

The header includes a sync byte, a transport error indicator, a payload unit start indicator, a transport priority, a packet identification (PID), a scrambling control, an adaptation field control, a continuity counter, and an adaptation field. A predetermined number of bits are allocated to each of these fields, and the header including these fields provides information associated with the TS packet.

The payload includes packeted audio/video data and service data, and the packeted audio/video data and service data are distinguished from each other by an elementary packet identifier (E_PID).

Figure 2:
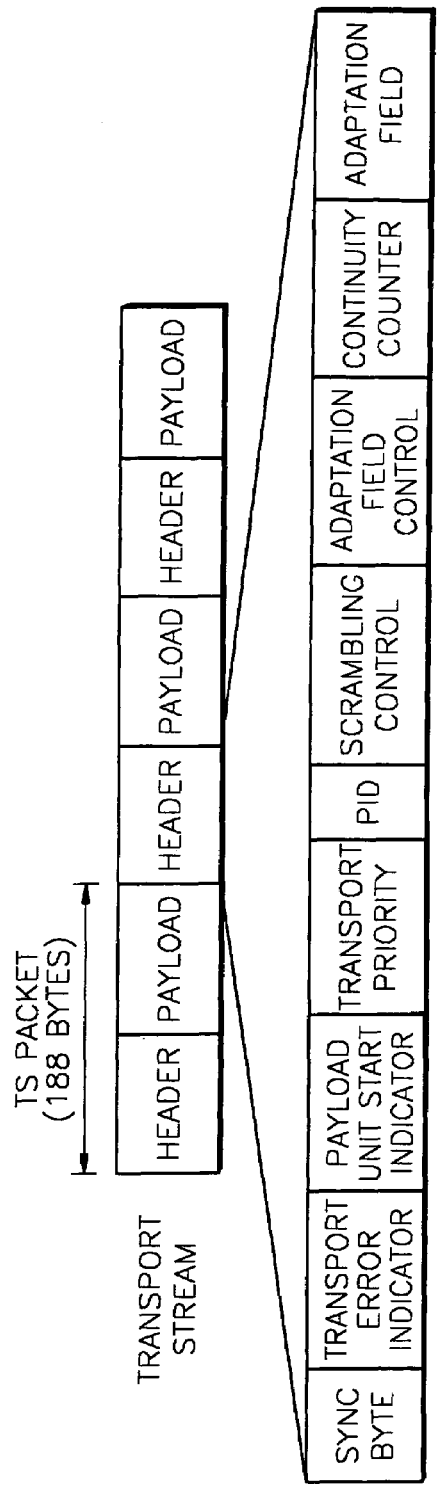
FIG. 2 illustrates the syntax of a moving picture experts group-2 transport stream (MPEG-2 TS) which can be used in a transfer method according to the present invention, and the syntax of a TS packet which is a constituent of the MPEG-2 TS.

Audio data, video data and service data from each broadcast station are each multiplexed in units of elementary packets and transported to a digital broadcast receiver via a transport stream of the MPEG-2 TS shown in FIG. 2.

Figure 3:
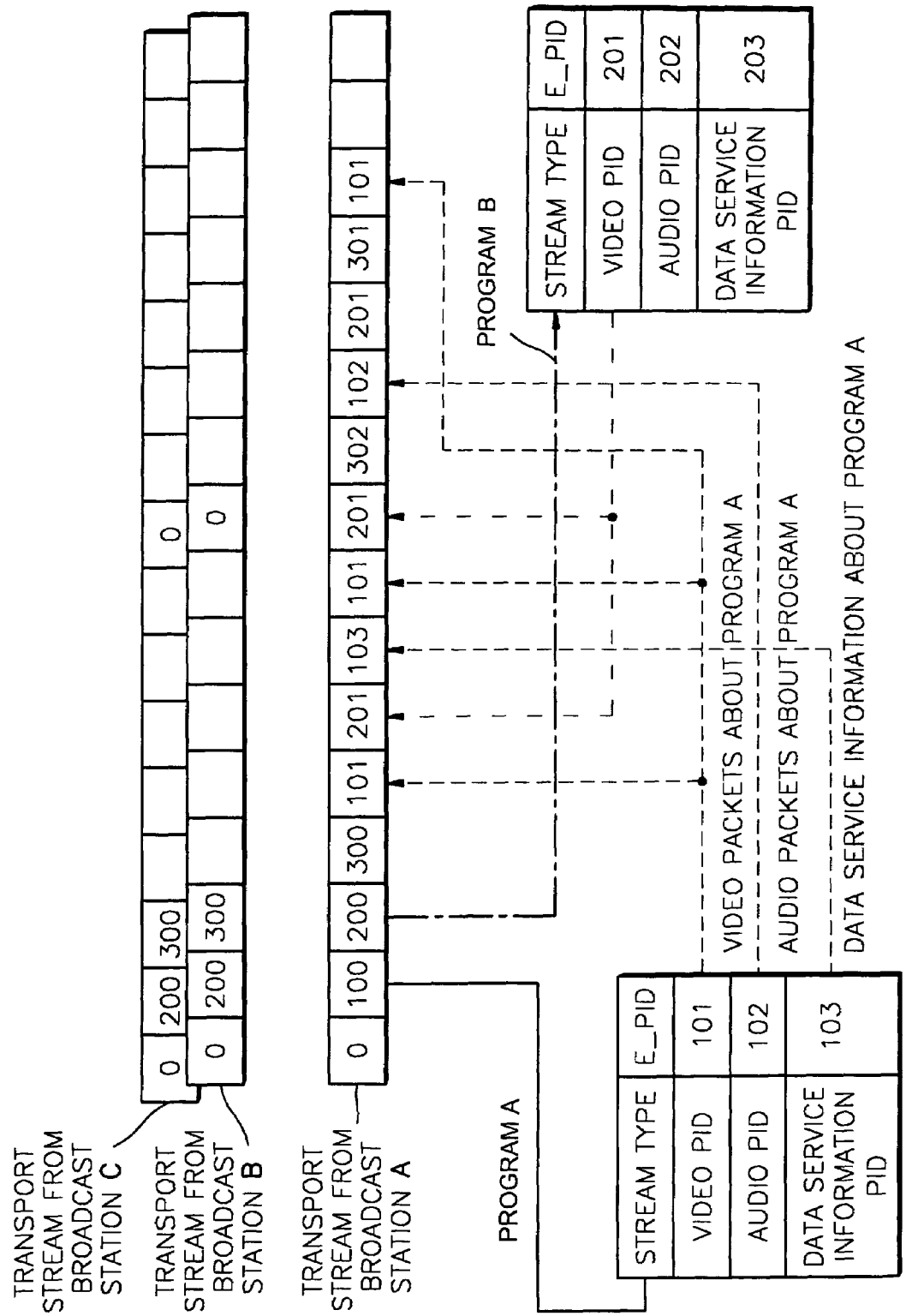
FIG. 3 illustrates transport streams from broadcast stations A, B and C, respectively, and the transfer of multiplexed audio data, video data and service data related to program A and program B from broadcast station A.

FIG. 3 illustrates transport streams from broadcast stations A, B and C, respectively, and the multiplexing and transmission of audio data, video data and service data about each of programs A and B from broadcast station A.

Here, the service data includes information which informs a digital TV of the relationship between an application and data for providing a service in an interactive system in compliance with a viewer's request. In an ATSC data broadcasting service, this information is specified in a service description table (SDT). The service data is repeatedly transferred by the data carousel method during the effective period of a broadcasting program.

According to the present invention, when a service data provider manufactures service data contents, information associated with the operating mode of an application (i.e., an initial_application descriptor) is added in the SDT. When an application and the SDT having information associated with the operating mode of the application are transmitted to a digital broadcast receiver via a broadcast station, the receiver executes a received application with reference to the information associated with the operating mode of the application included in the SDT, on receipt of the application or in compliance with a viewer's request.

The initial_application descriptor, which is added to the SDT according to a preferred embodiment of the present invention, is constituted of:

initial_application descriptor ( ){
descriptor_tag
descriptorLength
auto_flag
auto_boot_applicationNameLength
auto_boot_applicationName
}

The descriptor_tag field denotes an indicator. The descriptorLength field denotes the length of the contents after the descriptorLength field. The auto_flag field represents whether an application is to be executed manually or automatically. The auto_boot_applicationNameLength field denotes the length of the name of an application. The auto_boot_applicationName field denotes the name of the application.

In the embodiment of the present invention, the auto_flag field is used to represent whether an application is to be executed manually or automatically. However, it is understood that one of ordinary skill in the art could easily modify the auto_flag field into a delayed operating mode whereby a point in time is set for the operation of an application.

Figure 4:
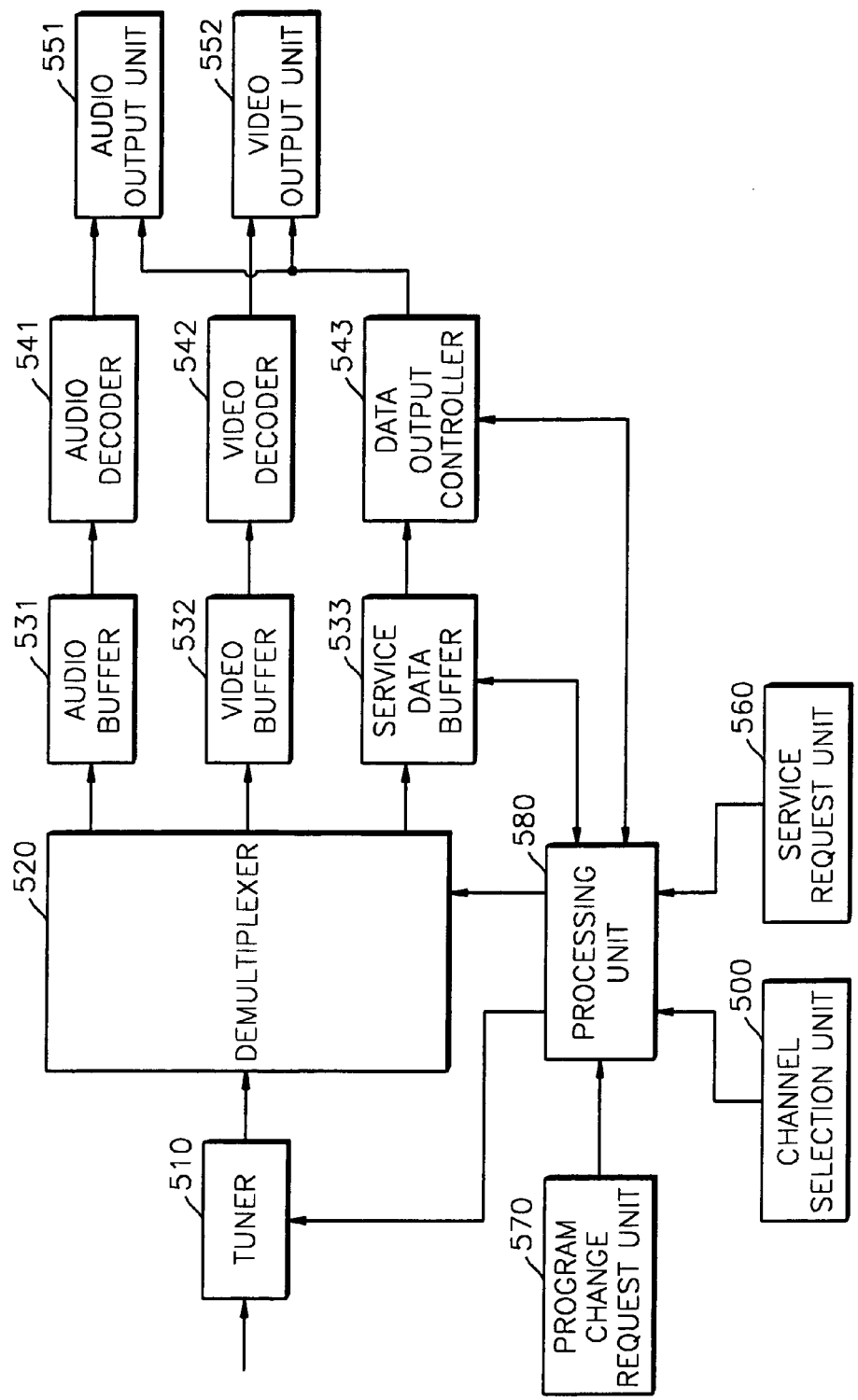
FIG. 4 is a block diagram of a digital broadcast receiver according to the present invention.
Figure 5:
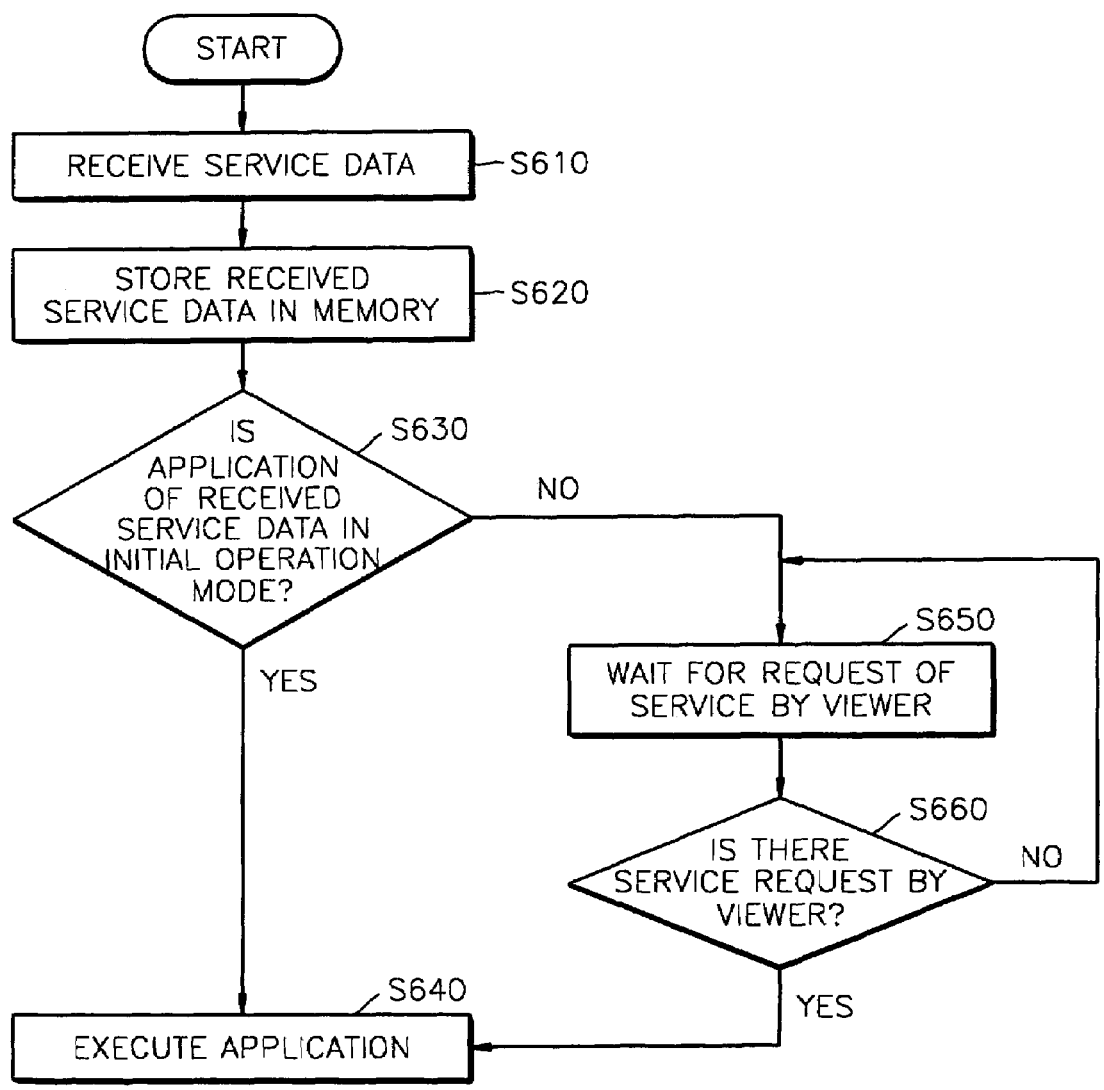
FIG. 5 is a flowchart illustrating a method of processing an application in a digital broadcast system according to the present invention.

A digital broadcast receiver according to the present invention is shown in FIG. 4. Referring to FIG. 4, a tuner 510 selects and receives a transport stream from a particular broadcast station under the control of a processing unit 580 when a broadcast station channel is selected by a viewer via a channel selection unit 500. A demultiplexer 520 receives the transport stream from the particular broadcast station, extracts audio/video data about a particular program and service data which is transported by the carousel method, and temporarily stores the audio data, the video data and the service data in an audio buffer 531, a video buffer 532 and a service data buffer 533, respectively. An audio decoder 541 and a video decoder 542 decode the extracted audio data and video data, respectively, and output the decoded audio data and video data to an audio output unit 551 and a video output unit 522, respectively.

A data output controller 543 controls the output of the extracted service data and outputs the controlled service data to the audio/video output units 551 and 552.

A service request unit 560 receives a viewer's request to provide a data service associated with a program, and sends the request to the processing unit 580, and a program change request unit 560 receives a viewer's request to change programs, and sends the request to the processing unit 580.

The processing unit 580 analyzes the SDT for the extracted service data, and executes a received application. That is, the processing unit 580 does not execute an application which is set in the auto_boot_applicationName field, until a service is requested by a viewer through the service request unit 560, when the auto_flag field of the initial_application descriptor is "0". When the auto_flag field is "1", the processing unit 580 automatically executes the application which is set in the auto_boot_applicationName field, regardless of the existence or non-existence of a service request of a viewer.

Figure 6A:
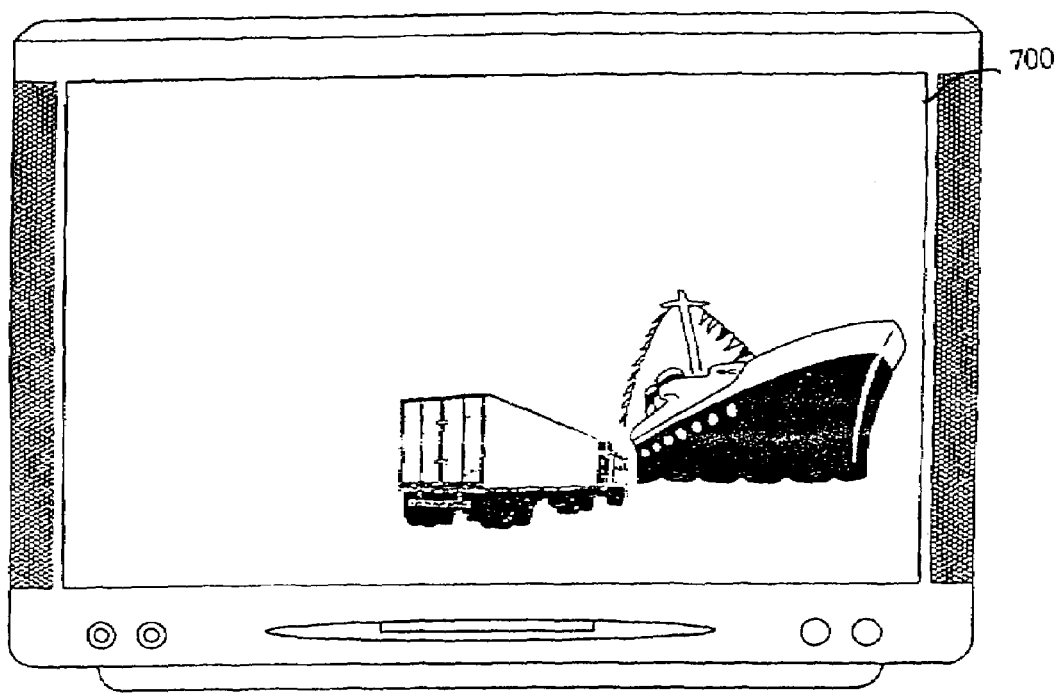
FIGS. 6A, 6B and 6C are screens for illustrating a method of processing an application in a digital broadcast system according to the present invention.

A method of processing an application in a digital broadcast system according to the present invention will now be described with reference to FIGS. 4-5 and 6A through 6C. First, as shown in FIG. 6A, while a program is being broadcasted on screen 700 through the audio output unit 551 and the video output unit 552, the processing unit 580 receives service data from a broadcast station, in step S610. In the current example, the service data includes an application in an initial operating mode associated with the news, such as a real-time check of the movement of the stock market or a dealing in stocks.

After the service data is received from the broadcast station, the processing unit 580 stores the received service data in the service data buffer 533, in step S620. Specifically, the processing unit 580 controls the tuner 510 so that the tuner 510 applies a transport stream from a specific broadcast station to the demultiplexer 520. The demultiplexer 520 demultiplexes a particular program in the received transport stream to extract audio data, video data and service data (that is, an application), and stores the audio data, the video data and the service data in the audio buffer 531, the video buffer 532 and the service data buffer 533, respectively. Then, the processing unit 580 analyzes the SDT of the received service data to determine whether the application of the received service data is in an initial operating mode, in step S630. If it is determined that the application is in an initial operating mode, the application is executed, in step S640. Otherwise, the application waits until there is a service request by a viewer, in step S650. Then, it is determined whether there is a service request by a viewer, in step S660. If it is determined that there is a service request by the viewer, the application is executed, in step S640. That is, the processing unit 580 does not execute an application, which is set in the auto_boot_applicationName field, until a service is requested by a viewer through the service request unit 560, when the auto_flag field of the initial_application descriptor in the SDT for the received service data is "0". When the auto_flag field is "1", the processing unit 580 automatically executes the application, which is set in the auto_boot_applicationName field.

Figure 6B:
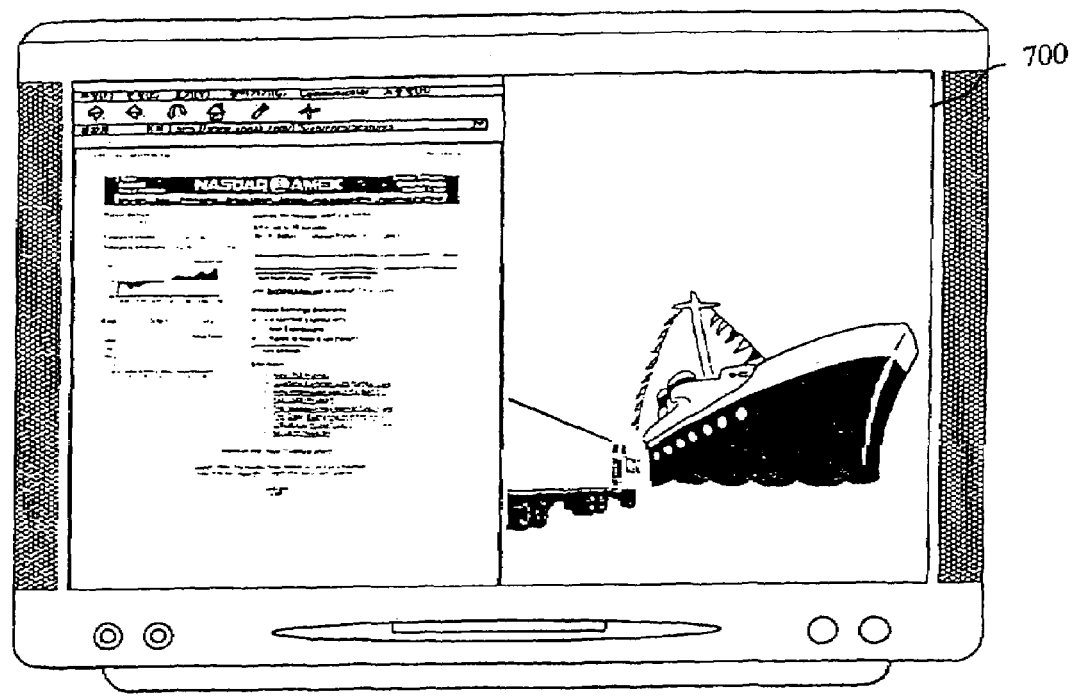
Figure 6C:
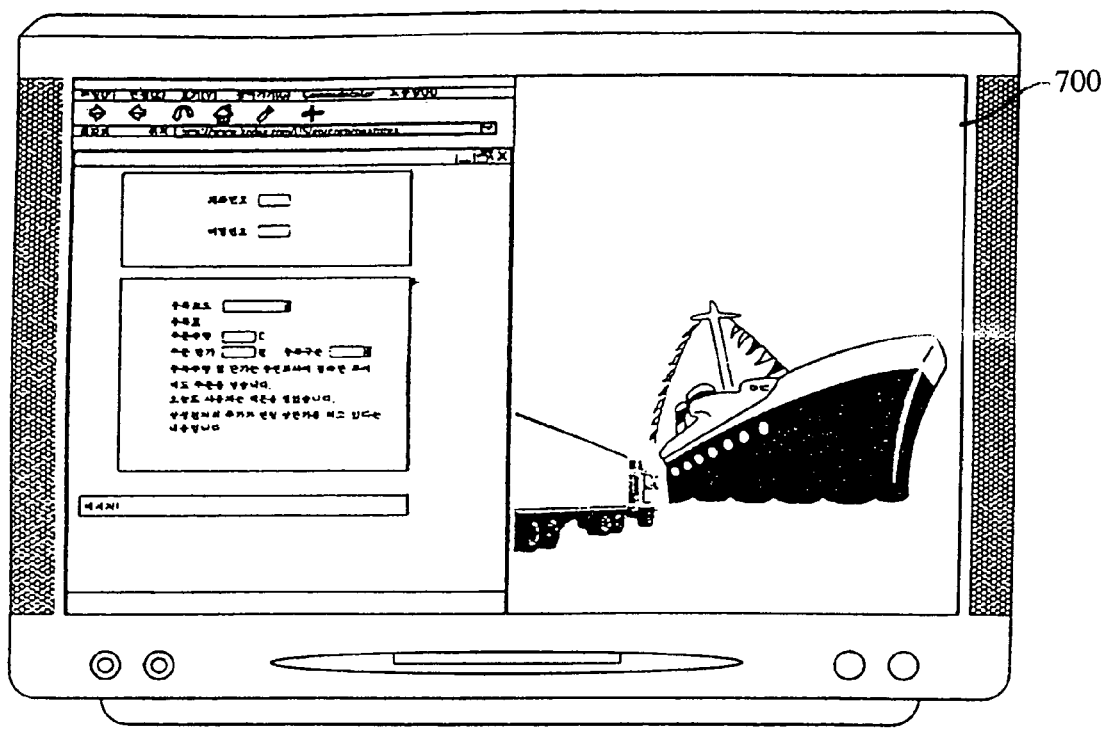

In other words, in the current example shown in FIG. 6B, the news on current share quotations are in initial operating mode. As such, the application operates automatically and the current share quotations of enterprises listed on the stock exchange are displayed, or a window for stock trading is automatically displayed on a screen 700 via the video output unit 552, as shown in FIG. 6B. However, for other applications are not in initial operation mode and are instead reliant on the selection of the viewer. Thus, when a viewer selects a corresponding menu from the displayed window for trading stock, a trading stock application appears on screen 700, and home stock trading can be realized as is seen in FIG. 6C.

According to the present invention described above, a digital broadcast system for broadcasting additional service data together with broadcast programs can arbitrarily select the point of time at which an application provided to a digital broadcast receiver is executed, during the manufacture of contents, so that various types of interactive services can be provided.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of processing an application in a digital broadcasting receiver, the method comprising:
   receiving an application and a service table, the service table including a field associated with an operating mode of the application;
   analyzing the service table to obtain a value of the field associated with the operating mode of the application, wherein the value of the field is set by a service provider;
   determining the operating mode of the application based on the value of the field; and
   processing the application according to the operating mode of the application, the operating mode of the application selectively including one of
   an initial operating mode in which the application is automatically executed after being received, and
   a present mode in which the application is present in the digital broadcasting receiver and waits until there is a request from a user to process the application.

2. The method of claim 1, wherein the present mode comprises a manually-operated mode and a delayed operating mode, the delayed operating mode being a mode for reserving an operating time so that a point in time is set for operation of the application.

3. The method of claim 1, wherein the field associated with the operating mode of the application is included in a service description table (SDT) for service data.

4. The method of claim 3, wherein the name of the application is set in the SDT for the service data.

5. The method of claim 1, wherein the application and the service table are included in service data and the service data is transported in the form of a moving picture experts group-2 transport stream (MPEG-2 TS) packet.

6. The method of claim 1, wherein the application and the service table are included in service data and the service data is received by a data carousel method.

7. The method of claim 2, wherein the processing the application further comprises, when the operating mode of the application is the delayed operating mode as indicated by the selected one of the states, waiting until a point in time specified by the delayed operating mode, and then beginning execution of the application at the point in time.

8. A digital broadcasting receiver comprising:
   a data receiving unit which receives application and a service table including a field associated with an operating mode of the application; and
   a processing unit which receives application and the service table,
   analyzes the service table to obtain a value of the field associated with the operating mode of the application, wherein the value of the field is set by a service provider,
   determines the operating mode of the application based on the value of the field, and
   processes the application according to the operating mode of the application,
   wherein the operating mode of the application includes:
   an initial operating mode in which the application is automatically executed after being received, and a present mode in which the application is present in the digital broadcasting receiver and waits until there is a request from a user before processing the application.

9. The digital broadcast receiver of claim 8, wherein the field associated with the operating mode of the application is included in a service description table (SDT) for service data.

10. The digital broadcast receiver of claim 9, wherein a name of the application is set in the SDT for the service data.

11. The digital broadcast receiver of claim 8, wherein the application and the service table are included in service data and the service data is transported in the form of an MPEG-2 TS packet.

12. The digital broadcast receiver of claim 8, wherein the application and the service table are included in service data and the service data is transported by a data carousel method.

13. The digital broadcast receiver of claim 8, wherein the processing unit further determines from the selected one of the states if the operating mode of the application is a delayed operating mode, and when the operating mode of the application is the delay operating mode, waits until a point in time specified by the delayed operating mode, and then begins execution of the application at the point in time.

14. A digital broadcasting method comprising:
providing an application and a service table, the service table including a field associated with an operating mode of the application, wherein a value of the field is set by a service provider and the application allows a digital broadcasting receiver to perform a particular operation; and
transmitting the application and the service table to the digital broadcasting receiver such that the operating mode of the application is selectively determined, based on a value of the field to be one of
an initial operating mode in which the application is automatically executed after being received, and
a present mode in which the application is present in the digital broadcasting receiver and waits until there is a request from a user to process the application.

15. The method of claim 14, wherein the present mode comprises a manually-operated mode and a delayed operating mode, the delayed operating mode being a mode for reserving an operating time so that a point in time is set for operation of the application.

16. The method of claim 14, wherein the field associated with the operating mode of the application is included in a service description table (SDT) for service data.

17. The method of claim 16, wherein the name of the application is set in the SDT for the service data.

18. The method of claim 14, wherein the application and the service table are included in service data and the service data is transported in the form of a moving picture experts group-2 transport stream (MPEG-2 TS) packet.

19. The method of claim 14, wherein the application and the service table are included in service data and the service data is received by a data carousel method.

20. A digital broadcasting device comprising:
means for providing an application and a service table including a field associated with an operating mode of the application and being set by a service provider, the application allowing a digital broadcasting receiver to perform a particular operation;
means for determining the operating mode of the application based on the field; and
means for transmitting the application and the service table to the digital broadcasting receiver,
wherein the operating mode of the application comprises an initial operating mode in which the application is automatically executed independent of a user selection after being received, and a present mode in which the application is present in a digital broadcasting receiver and waits until there is a request from a user to process the application before executing.

21. A method of processing an application in a digital broadcasting system, the method comprising:
transmitting, from a digital broadcasting device to a digital broadcasting receiver, an application and a service table including a field associated with an operating mode of the application, wherein the application allows a digital broadcasting receiver to perform a particular operation and a value of the field is set by a service provider,
the digital broadcast receiver receiving the application and the service table and processing the application according to the operating mode of the application,
wherein the operating mode of the application is selectively determined, based on the value of the field, to be one of
an initial operating mode in which the application is automatically executed after being received, and
a present mode in which the application is present in the digital broadcasting receiver and waits until there is a request from a user before processing the application.

22. The method of claim 21, wherein the present mode comprises a manually-operated mode and a delayed operating mode, the delayed operating mode being a mode for reserving an operating time so that a point in time is set for operation of the application.

23. The method of claim 21, wherein the field associated with the operating mode of the application is included in a service description table (SDT) for service data.

24. The method of claim 23, wherein the name of the application is set in the SDT for the service data.

25. The method of claim 21, wherein the application and the service table are included in service data and the service data is transported in the form of a moving picture experts group-2 transport stream (MPEG-2 TS) packet.

26. The method of claim 21, wherein the application and the service table are included in service data and the service data is received by a data carousel method.

27. A digital broadcasting system comprising:
a digital broadcast device which transmits an application and a service table including a field associated with an operating mode of the application, wherein a value of the field is set by a service provider and the application allows a digital broadcasting receiver to perform a particular operation;
the digital broadcast receiver which receives the application and the service table, determines the operating mode of the application based on the value of the field and processes the application according to the operating mode of the application, wherein the operating mode of the application is selectively determined to be one of
an initial operating mode in which the application is automatically executed after being received, and
a present mode in which the application is present in the digital broadcasting receiver and waits until there is a request from a user before commencing processing the application.

28. The digital broadcast system of claim 27, wherein the digital broadcasting receiver comprises:
a service data receiving unit which receives service data that includes the application and the service table;
a storage unit which stores the service data received from the service data receiving unit;

a service request unit which requests the service with respect to the received service data; and a processing unit which determines whether the operating mode of the application is the initial operating mode with reference to the information associated with the operating mode of the application in the service data stored in the storage unit, and, if it is determined that the operating mode is the initial operating mode, executes the application, and otherwise, waits until the service is requested by a viewer through the service request unit, and then executes the application.

29. The digital broadcast system of claim 27, wherein the field associated with the operating mode of the application is included in a service description table (SDT) for service data.

30. The digital broadcast system of claim 29, wherein a name of the application is set in the SDT for the service data.

31. The digital broadcast system of claim 27, wherein the application and the service table are included in service data and the service data is transported in the form of a moving picture experts group-2 transport stream (MPEG-2 TS) packet.

32. The digital broadcast system of claim 27, wherein the application and the service table are included in service data and the service data is transported by a data carousel method.

33. A method of processing an application in a digital broadcasting receiver, the method comprising:
  receiving an application and a service table, the service table including a field indicating an operating mode of the application;
  analyzing the service table to obtain a value of the field associated with an operating mode of the application, wherein the value of the field is set by a service provider;
  determining the operating mode of the application based on the value of the field, the operating mode of the application selectively including one of
  an initial operating mode in which the application is automatically executed, independent of a user selection, after being received, and
  a present mode in which the application is present in the digital broadcasting receiver and waits until there is a request initiated by a user to process the application; and
  processing the application according to the operating mode.

* * * * *

UNITED STATES PATENT AND TRADEMARK OFFICE
CERTIFICATE OF CORRECTION

PATENT NO. : 7,716,713 B1 Page 1 of 1
APPLICATION NO. : 09/574003
DATED : May 11, 2010
INVENTOR(S) : Joo-hyeon Ryu et al.

It is certified that error appears in the above-identified patent and that said Letters Patent is hereby corrected as shown below:

Column 8, Line 53, change "application" to --an application--.

Column 8, Line 56, change "application" to --an application--.

Signed and Sealed this

Seventeenth Day of August, 2010

David J. Kappos
*Director of the United States Patent and Trademark Office*